April 10, 1928.
N. M. SLEEPER
1,665,480
AIRPLANE
Filed April 13, 1927
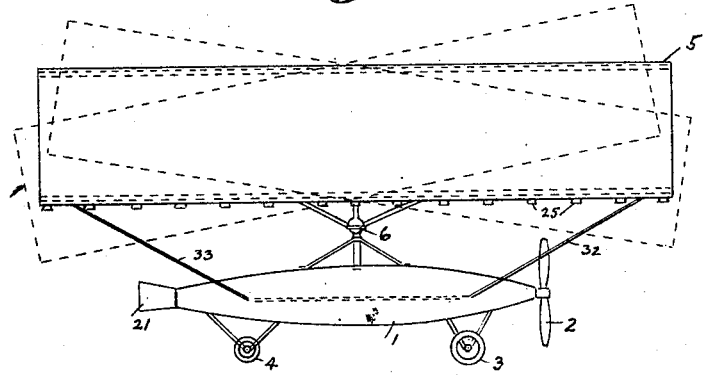
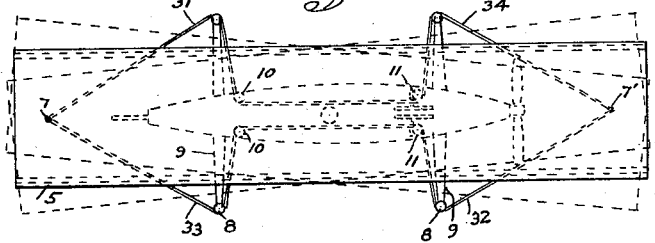
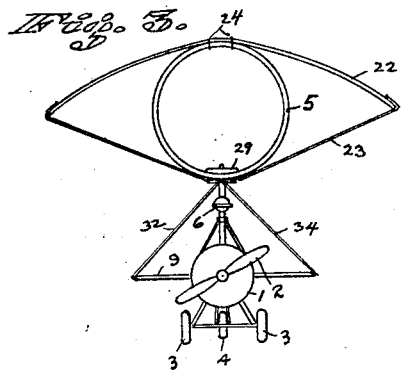
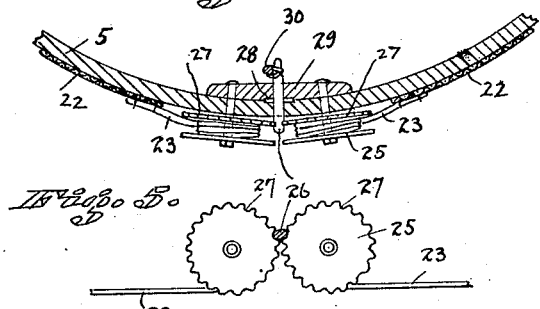
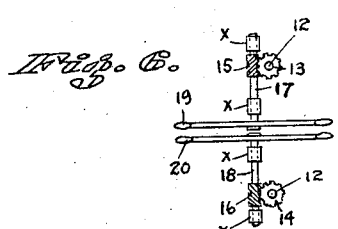
INVENTOR
Ned M. Sleeper
BY Miller & Boykew
his ATTORNEYS Patented Apr. 10, 1928.

1,665,480

UNITED STATES PATENT OFFICE.

NED M. SLEEPER, OF UPPER LAKE, CALIFORNIA.

AIRPLANE.

Application filed April 13, 1927. Serial No. 183,494.

This invention relates to airplanes and has for its objects an improved construction whereby the craft will be supported against the air without the use of laterally projecting ailerons or wings, the craft will be more stable in adverse air currents, may be easily controlled and directed to various paths of travel either upward, downward or laterally turned without the use of a rudder, and which provides emergency means against violent falling of the craft in case the engine should cease to function, and all the above in a structure of simple rugged design. Other objects lie in the constructional features shown in the drawings and described herein.

In the drawings Fig. 1 is a side elevation of my improved air craft as it would appear in horizontal flight. Fig. 2 is a plan view of the craft. Fig. 3 is an end view with the emergency means released to operative position to prevent injurious falling of the craft. Figs. 4 and 5 are details of the release mechanism for the emergency means, and Fig. 6 is a detail of the hand control for changing the angle of the supporting plane.

Briefly described my invention comprises dispensing with the wings of an airplane and supporting the craft by means of a large tubular "plane" arranged longitudinally above a fuselage and controllably mounted on a universal joint so that the tubular plane may be tipped either up or down and/or swung either to right or left, and whereby the craft may be guided in any of the directions indicated without the use of a rudder.

In the drawings the fuselage is shown at 1 and it contains the usual power plant for driving the propeller 2, and is preferably provided with wheels as at 3, 4 for supporting the craft on the ground in the well known manner.

Longitudinally above the fuselage is a relatively large tubular supporting plane 5 mounted on a universal joint 6 suitably braced to both fuselage and plane as indicated.

This tubular plane 5 is of any suitable construction either of metal sheets or prepared cloth supported on framework so as to present smooth exterior and interior surfaces and is entirely open at both ends.

The object of the universal joint mounting of the tubular element is to provide for tipping the tube to any angular position as indicated in dotted lines in Fig. 1 or to any lateral angular position as indicated by the dotted lines in Fig. 2.

To accomplish the tipping and rotating of the tubular element various means may be employed but I prefer a system of ropes or chains 31, 32, and 33, 34, secured to the element 5 at respectively 7, 7' and extending therefrom angularly to and over guide pulleys 8 on arms 9 projecting laterally from the fuselage, the chains then passing into the fuselage over idlers 10 and sprockets 11 as shown in Fig. 2.

By this arrangement, if bights 31 and 33 were simultaneously pulled into the fuselage and bights 32 and 34 played out, the rear end of the tubular element 5 would be tipped downward and the forward end elevated, a reverse operation tipping it in reverse direction. Whereas, to angularly twist the tube sidewise or that is to rotate it slightly on the universal joint 6 in a horizontal plane, bights 31 and 32 are pulled toward the fuselage and bights 33 and 34 slacked off, or vice versa.

To thus manipulate the ropes or chains the sprockets 11 are independently or simultaneously operated by suitable gear means, for instance as shown in Fig. 6 and wherein the shafts 12 are the ones which carry the sprockets 11, 11 (here omitted) and are fitted with right and left worm gears 13—14 engaged respectively by right and left worms 15—16 mounted on aligned shafts 17—18 suitably supported in bearings at points X and which shafts at their confronting ends are provided with a pair of duplicate ship's steering wheels 19—20.

These wheels 19—20 are close together so that both may be revolved at once in either direction to thus control the vertical angle or tipping of the tubular plane in either direction, while by operating either wheel separately or both in opposite directions the horizontal angle may be changed in either direction, or as is manifest any combination of vertical and horizontal angles may be obtained.

With the gearing shown it will be necessary to use worm gears of sufficient angularity of tooth to permit reversal so that one wheel can idle if one only is operated, tho if a lesser angle is used the locking effect is better which frees the pilot's hands on long straight runs.

The lateral twisting of the plane 5 takes care of steering very effectively and dispenses with the use of a rudder, tho I show a small rudder 21 which is only to be used in an emergency if for some reason the control apparatus for the plane 5 should not work.

As a provision against too sudden a descent in case the engine stopped or propeller was shattered, I provide an extra sheet of prepared cloth or the like wrapped about the tubular element 5 and which may be released along its two free lower edges so as to fly out to the position as indicated at 22 in Fig. 3 firmly sustained by any number of ropes 23 so as to provide in addition to the sustaining surface of the tubular plane 5, a large parachute effect.

This extra covering is preferably secured to the tubular element 5 along the top as at 24—and when the covering is tightly wrapped about the tube the ropes 23 are secured at their ends to and wound upon flanged pulleys 25 locked by pawls as at 26, one pawl engaging the serrated flange 27 of two adjacent pulleys from oppositely extending ropes, and the pawls being pivoted to the frame of the tubular element at 28 with their free ends extending through the keelson 29 and all connected to a rope 30 running the length of the keelson and suitably arranged for pulling from within the fuselage, so that upon a single pull the pawls will all be released and the wrapping will fall outward and upward with the air pressure to the position shown in Fig. 3.

After an emergency descent thus effected the extra wrapping sheet 22 is brought smoothly back in place and secured as before explained.

It is of course obvious that the sheet covering 22 may be plates of thin metal jointed to give flexibility if desired, or two curved sheets only hinged to the tubular plane at points 24 so as to open outwardly as shown in Fig. 3 or close snugly about the tubular plane, and therefore I intend the claims to embrace any such equivalent construction.

The tubular element 5 is shown as of round cross section but this may be varied without sacrificing all advantages of the invention, one of the features of which is the employment of a complete tubular aerofoil and which I have found to impart a stability in air unattained in the usual aerofoil construction.

In considering my invention as described, it is to be noted that tho I show ropes or chains arranged to effect control of the universal angular displacement of my plane 5 relative to the fuselage, I do not limit myself to this as any suitable arrangement for effecting this is sought to be covered in my claims:

I claim:

1. An airplane comprising a fuselage, a tubular aerofoil providing the main lifting and sustaining surface of the airplane mounted longitudinally above the fuselage, the mounting including a universal connection whereby the aerofoil may be angularly displaced laterally and vertically with reference to the fuselage.

2. An airplane comprising a fuselage, a cylindrical aerofoil providing the main lifting and sustaining surface of the airplane mounted centrally and longitudinally above the fuselage, the mounting including a joint whereby the cylindrical aerofoil may be tilted at various angles relative to the fuselage.

3. An airplane comprising a fuselage, a cylindrical aerofoil providing the main lifting and sustaining surface of the airplane mounted centrally and longitudinally above the fuselage, the mounting including a joint whereby the cylindrical aerofoil may be tilted at various angles relative to the fuselage and means for tilting said cylindrical aerofoil comprising lines extending angularly from opposite ends of the aerofoil, arms projecting laterally from the fuselage over which said lines extend, and means within the fuselage for manipulating said lines.

4. An airplane comprising a fuselage, a cylindrical aerofoil providing the main lifting and sustaining surface of the airplane mounted centrally and longitudinally above the fuselage, the mounting including a joint whereby the cylindrical aerofoil may be tilted at various angles relative to the fuselage and means for tilting said cylindrical aerofoil comprising lines extending angularly from opposite ends of the aerofoil, arms projecting laterally from the fuselage over which said lines extend, and means within the fuselage for manipulating said lines, said last mentioned means being adapted for operating on the lines selectively.

5. In a structure as specified in claim 1 means for moving said aerofoil to various positions of angularity in vertical and horizontal planes.

6. In a structure as specified in claim 1 means for moving said aerofoil to various positions of angularity in vertical and horizontal planes separately, or simultaneously.

7. In a structure as specified in claim 1 means for moving said aerofoil to various positions of angularity in vertical and horizontal planes separately, or simultaneously, said means comprising a plurality of lines extending from opposite ends of the aerofoil and guided to the fuselage, and manually controlled means within the fuselage arranged for operating said lines.

8. In a structure as specified in claim 1 means for moving said aerofoil to various positions of angularity in vertical and horizontal planes separately, or simultaneously, said means comprising a plurality of lines extending from opposite ends of the aerofoil and guided to the fuselage, and manually controlled means within the fuselage arranged for operating said lines, said last mentioned means including a pair of operative shafts, adjacent handwheels on said shafts, and transmission elements connecting said shafts to said lines for operation thereof.

9. An airplane comprising a fuselage, a cylindrical aerofoil providing the main lifting and sustaining surface of the airplane mounted longitudinally above the same for angular tipping thereabove, arms extending laterally from the fuselage, lines secured to the cylindrical aerofoil extending over said arms and into said fuselage, and means within the fuselage for operating said lines.

10. An airplane comprising a fuselage, a cylindrical aerofoil providing the main lifting and sustaining surface of the airplane mounted longitudinally above the same for angular tipping and lateral rotary movement thereabove, arms extending laterally from the fuselage, lines secured to the cylindrical aerofoil extending over said arms and into said fuselage, and means within the fuselage for operating said lines to effect selective tipping or rotation of said aerofoil.

11. An airplane comprising a fuselage, a cylindrical aerofoil longitudinally supported above the fuselage, an emergency covering sheet on said aerofoil to provide a parachute surface secured at its upper portion to the aerofoil and being free at its lower edge, and ropes arranged to sustain the sheet in parachute formation.

12. An airplane, comprising a fuselage, a cylindrical aerofoil longitudinally supported above the fuselage, an emergency covering sheet on said aerofoil to provide a parachute surface, secured at its upper portion to the aerofoil and being free at its lower edge, and ropes arranged to sustain the sheet in parachute formation, means for normally securing said sheet snugly about said aerofoil.

13. An airplane comprising a fuselage, a cylindrical aerofoil longitudinally supported above the fuselage, an emergency covering sheet on said aerofoil to provide a parachute surface secured at its upper portion to the aerofoil and being free at its lower edge, and ropes arranged to sustain the sheet in parachute formation, means for normally securing said sheet snugly about said aerofoil and means for effecting a quick release of the lower edge.

NED M. SLEEPER.